May 12, 1964     A. C. SAMPIETRO     3,132,536
TRANSMISSION SYSTEM INCLUDING FLUID TORQUE CONVERTER
AND EPICYCLIC CHANGE SPEED GEARING
Filed May 16, 1961     9 Sheets-Sheet 1

INVENTOR
Achille C. Sampietro
BY
Kenyon, Palmer,
Stewart & Estabrook
ATTORNEYS

INVENTOR
Achille C. Sampietro
BY
Kenyon, Palmer,
Stewart & Estabrook
ATTORNEYS

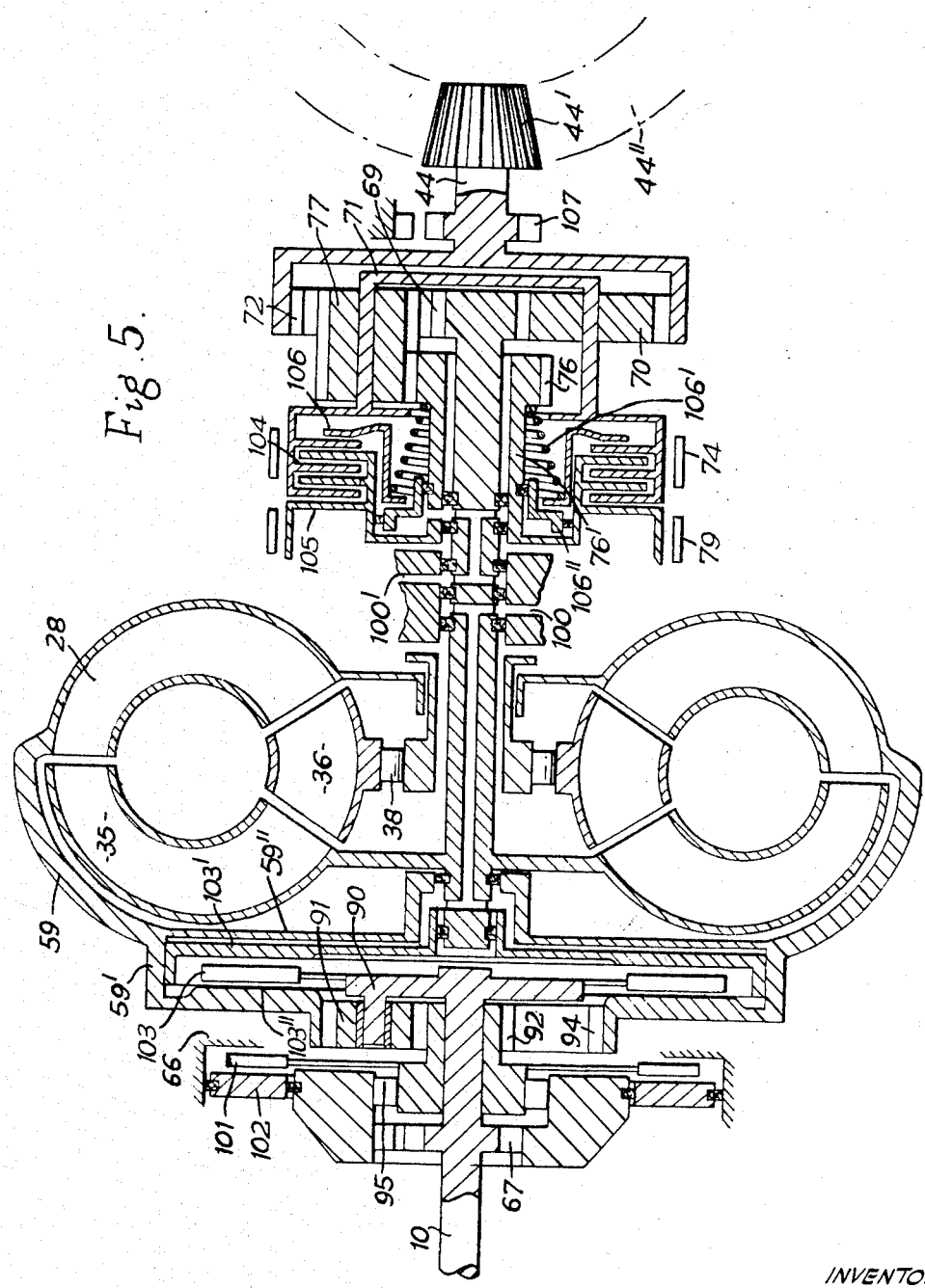

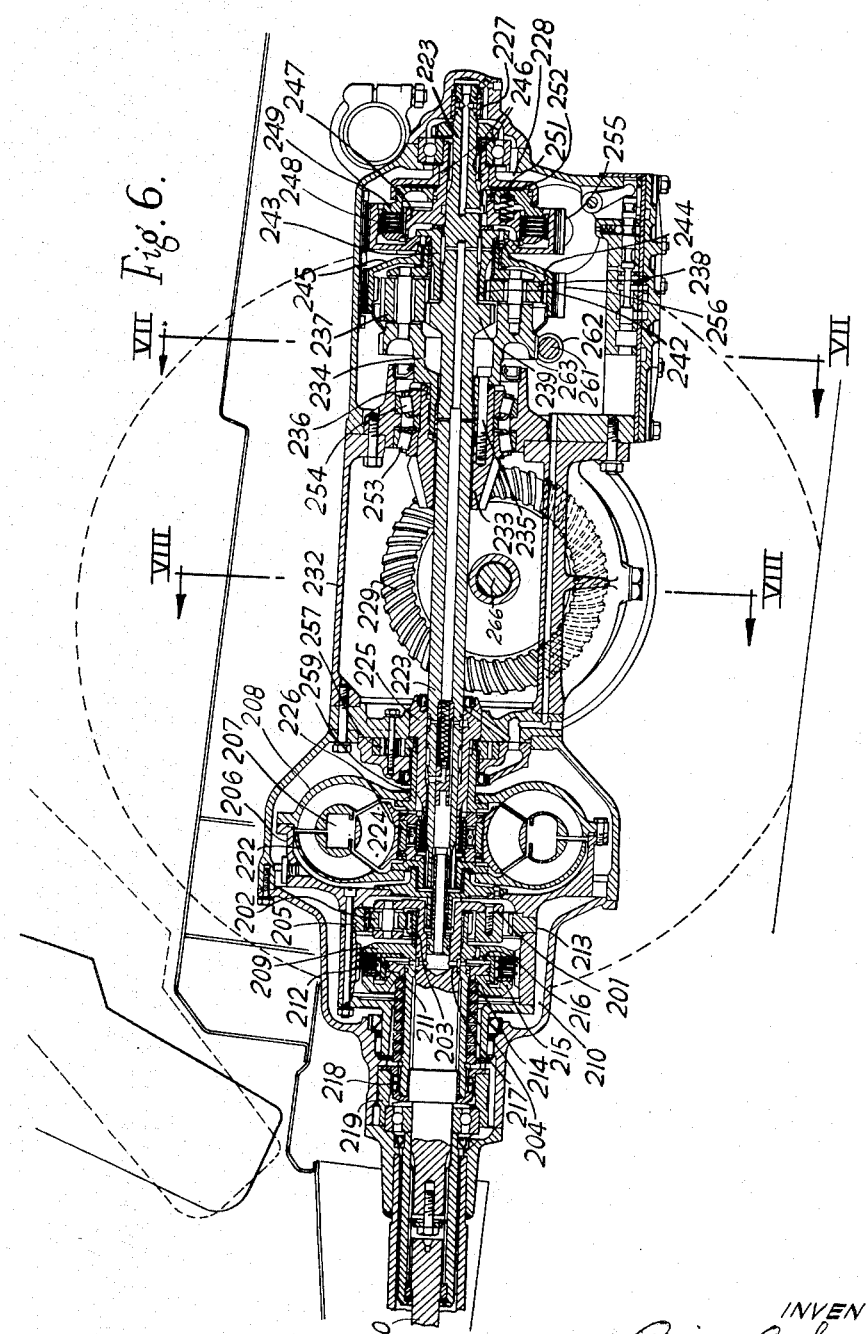

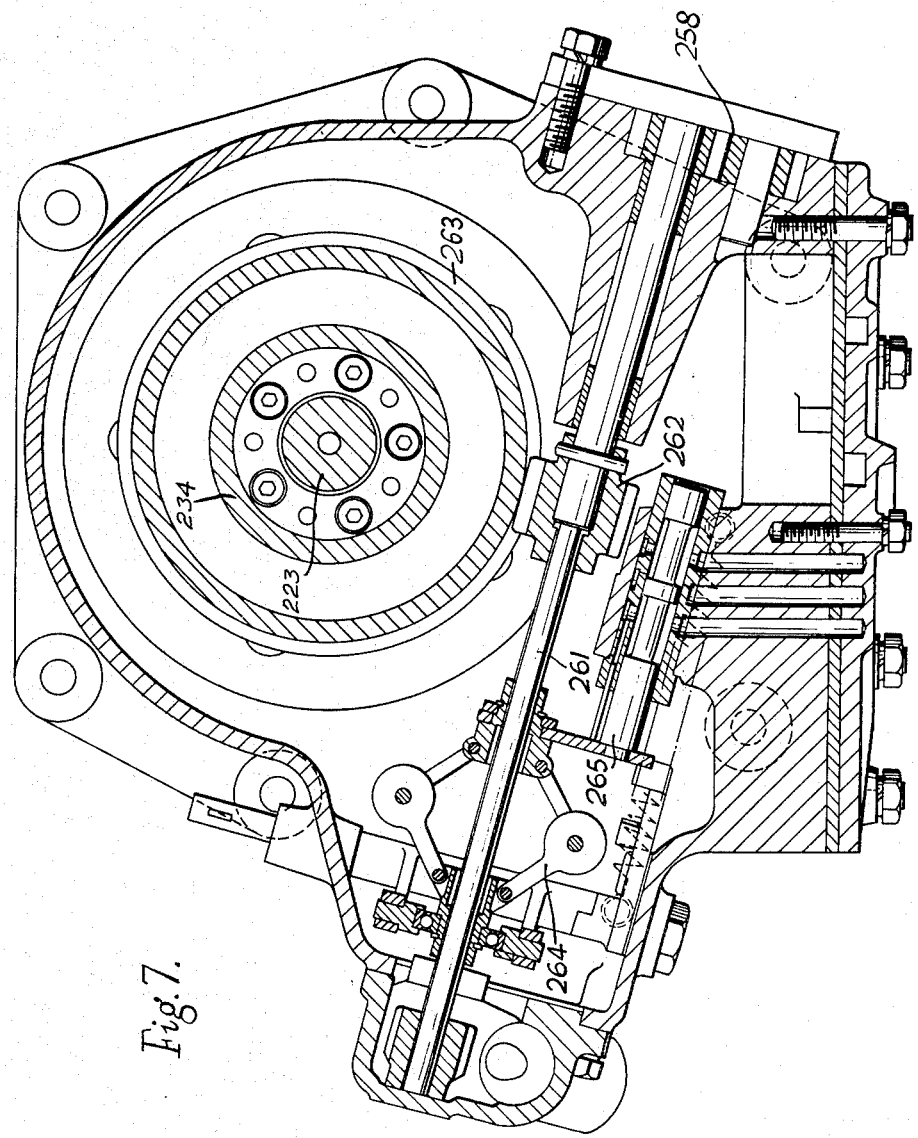

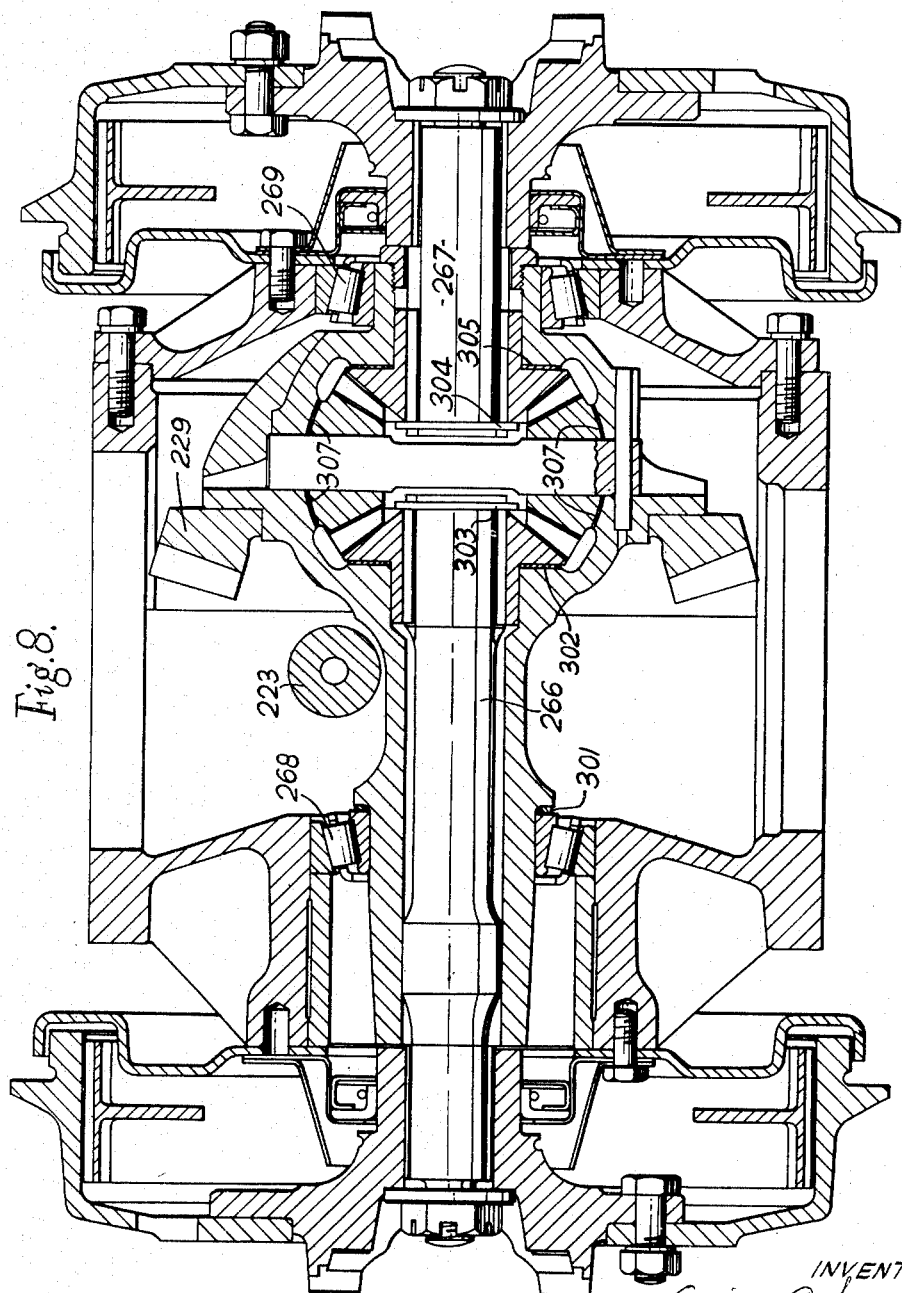

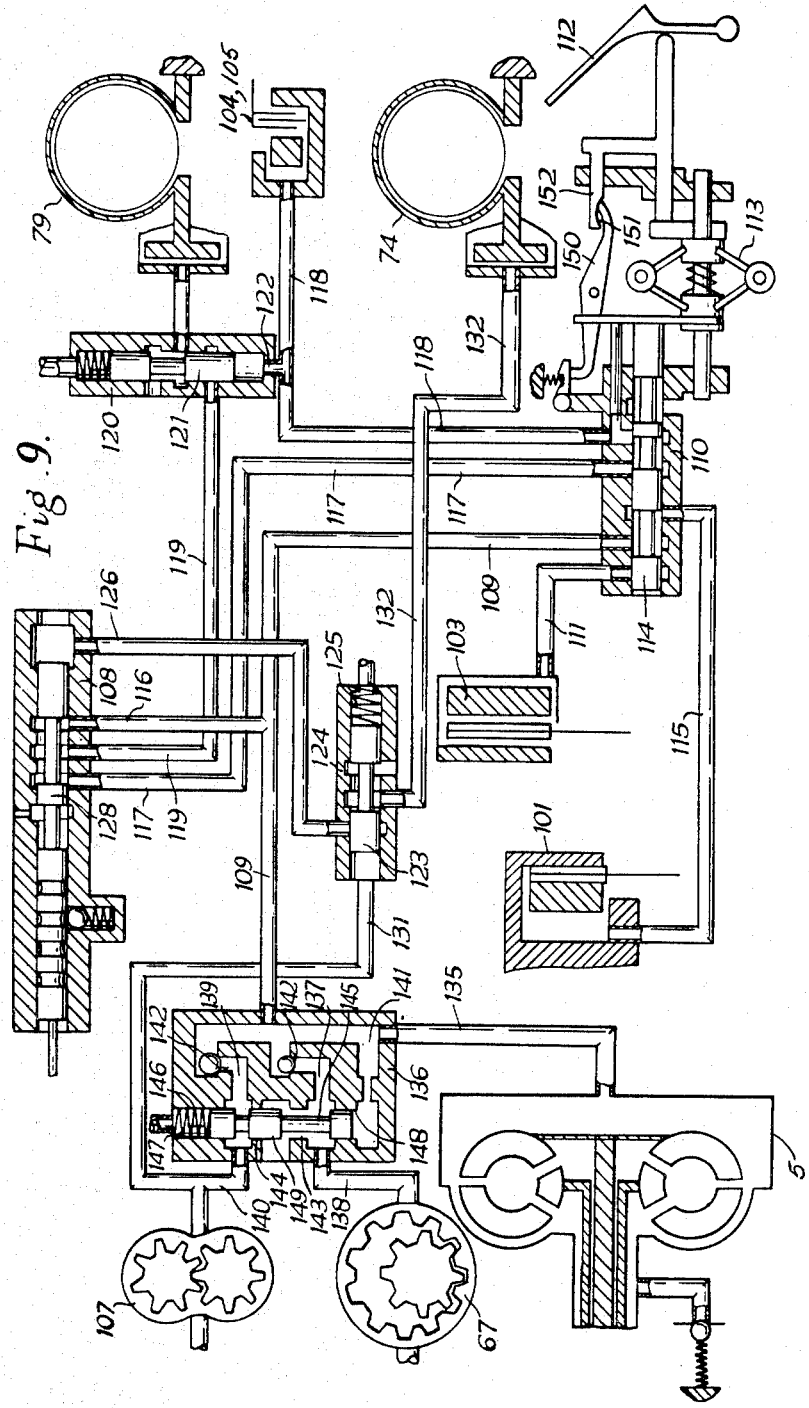

United States Patent Office 3,132,536
Patented May 12, 1964

3,132,536
TRANSMISSION SYSTEM INCLUDING FLUID
TORQUE CONVERTER AND EPICYCLIC
CHANGE SPEED GEARING
Achille Carlo Sampietro, 286 Puritan,
Birmingham, Mich.
Filed May 16, 1961, Ser. No. 110,408
Claims priority, application Great Britain Oct. 12, 1956
2 Claims. (Cl. 74—700)

This invention relates to automobile transmission systems and particularly to transmission systems of the type comprising a hydraulic transmission associated with epicyclic change speed gearing which can be set to provide overdrive as between the input shaft and output shaft of the system. The present invention thus relates to transmission systems of the same type as that described and claimed in my co-pending application Serial No. 687,159 filed September 30, 1957, and the present application is a continuation-in-part of that application and since abandoned.

An important object of the invention is to provide an improved system of this type which is particularly but not exclusively applicable to automobile drives wherein the rear wheels are independently sprung, or a De Dion type axle is used.

Another object of the invention is to provide a transmission system in which the hydraulic transmission can be given adequate ground clearance while being of adequate size and which at the same time enables the car floor to be flat.

A further object of the invention in one of its aspects is to enable two sets of epicyclic change speed gearing to be used, one before and one after the hydraulic transmission, and at the same time to enable the differential system to be located between the two sets of epicyclic gearing and to arrange the mounting of the pinion in the differential case in such a way that only one transmission shaft traverses the differential case.

An additional object of one aspect of the invention is to arrange the control system of the transmission system so that the car can be push started at a brisk walk.

A further object is to make engine braking available in direct drive without providing special arrangements for locking the unit.

Figure 1:
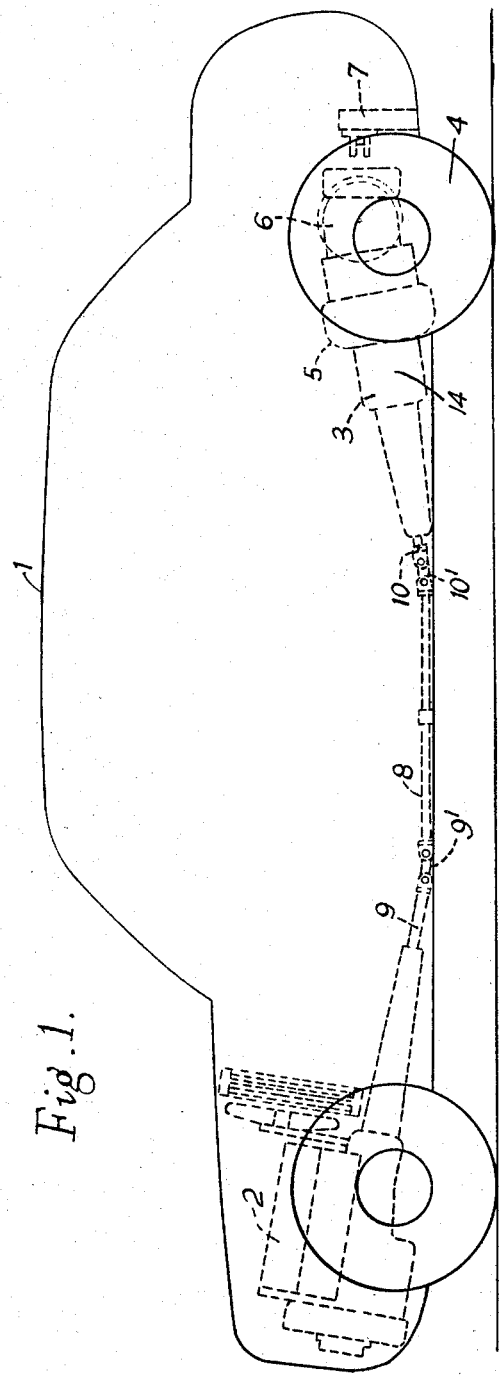
Figure 2:
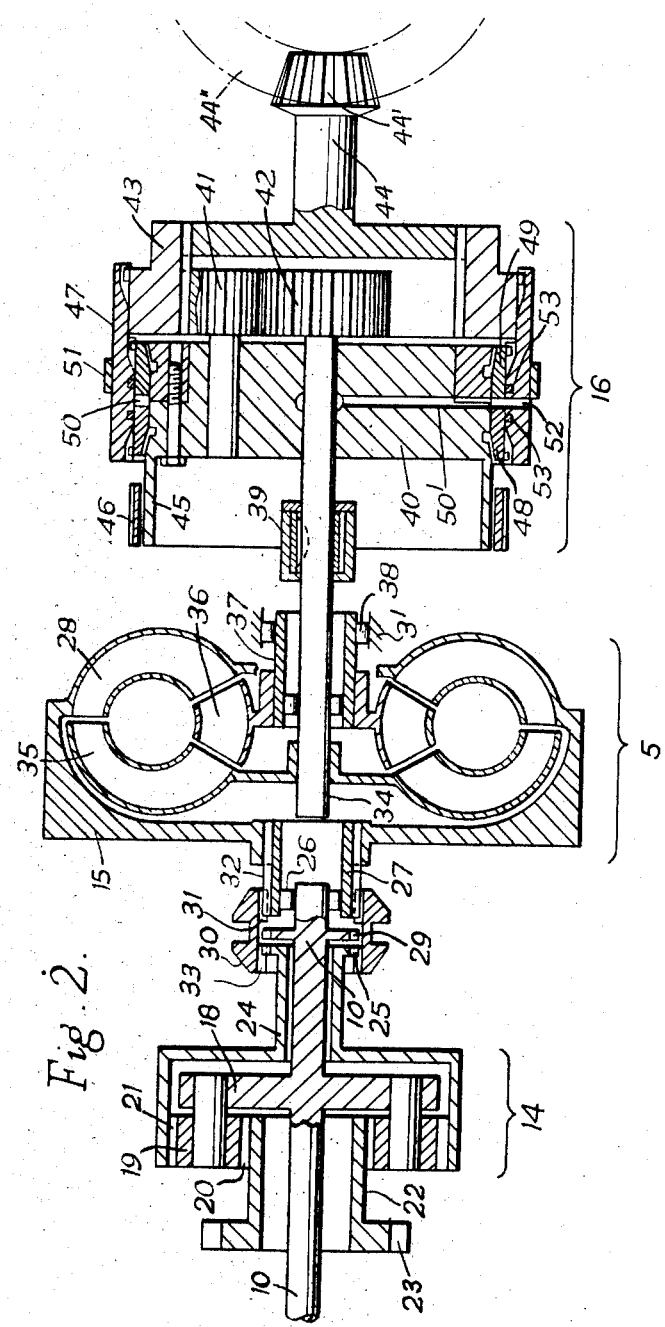
Figure 3:
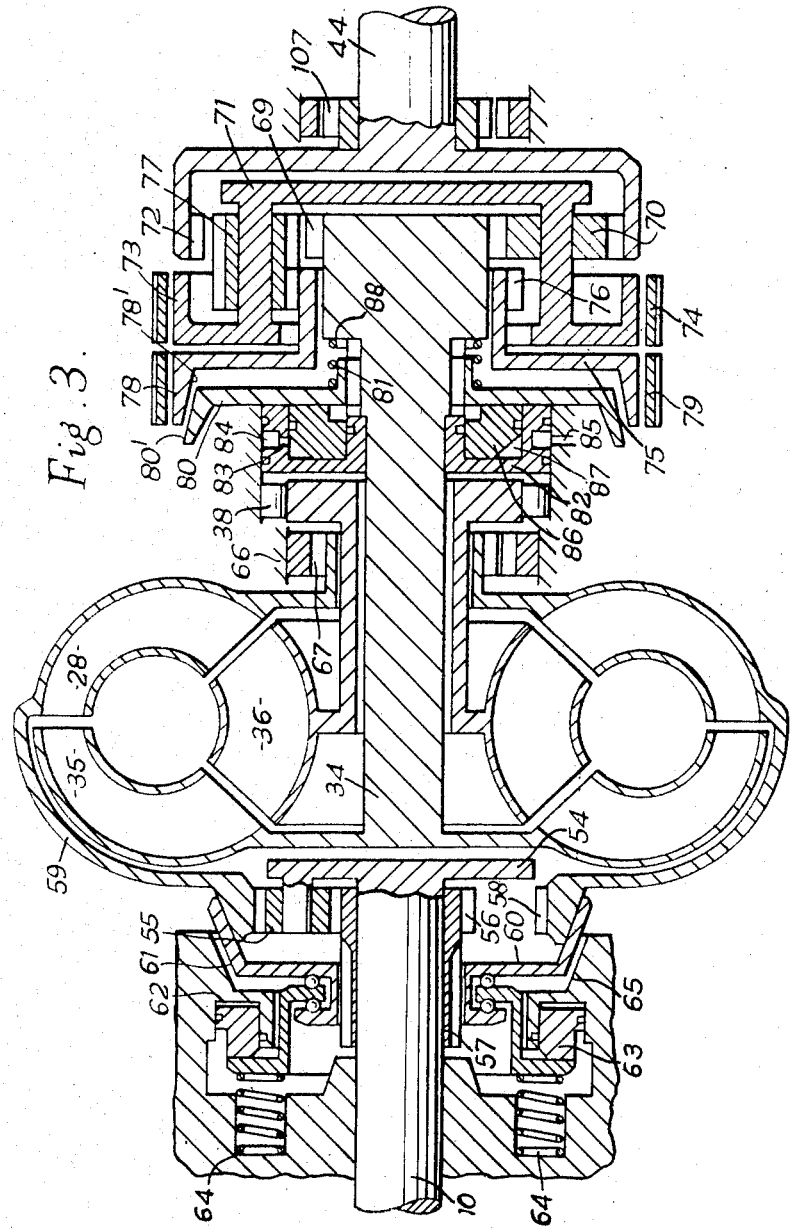
Figure 4:
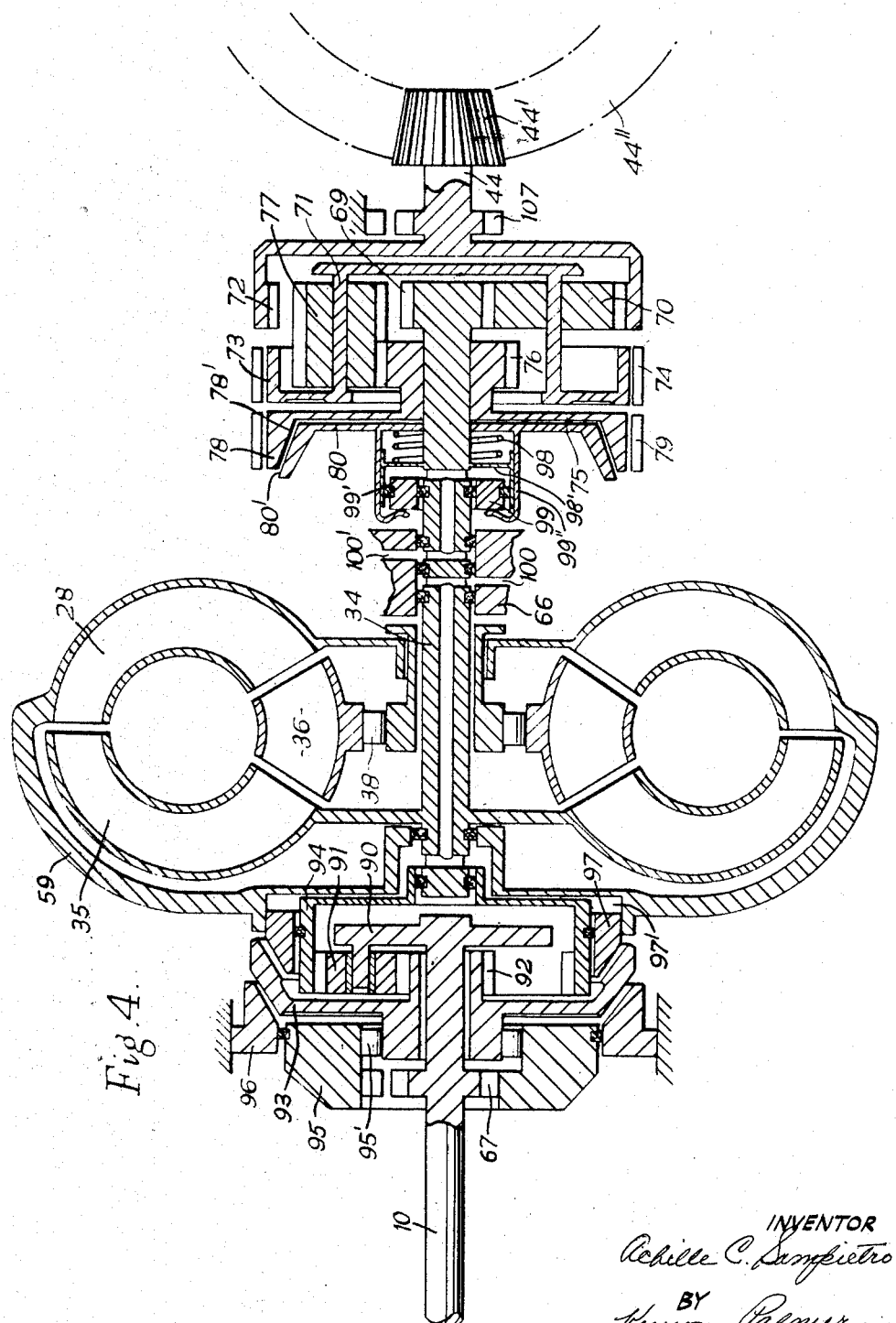

Further objects and advantages of the invention will become apparent upon consideration of the following description of several embodiments of the invention given by way of example with reference to the accompanying drawings in which:

FIG. 1 is an outline of an automobile showing in dotted lines the location of the power unit and transmission system, FIG. 2 is a sectional view showing one arrangement of a transmission system, FIGS. 3–5 are sectional views of further forms of transmission system, FIG. 6 is a longitudinal section through a further form of transmission system, FIG. 7 is a section on the line VII—VII of FIG. 6, FIG. 8 is a section on the line VIII—VIII of FIG. 6, and FIG. 9 is a diagrammatic layout of a hydraulic control system for the transmission systems of FIGS. 3–5.

Referring to the drawings, FIG. 1 shows the outline of an automobile 1 having a power unit (engine) 2 and a transmission system 3 for transmitting power to the rear wheels 4 of the automobile. The transmission system which includes a hydraulic transmission unit 5, has its casing integral with that of the differential unit 6, which is secured to the chassis 7 of the automobile. A propeller shaft 8 interconnects the output shaft 9 of the power unit 2 and the input shaft 10 of the transmission system. The power unit 2 is located adjacent the front of the automobile with its axis inclined downwards and rearwards and the transmission system 3 is located adjacent the rear of the automobile with its axis inclined downwards and forwards, the horizontal propeller shaft 8 being connected to the inclined shafts 9 and 10, by universal joints 9' and 10' respectively. With this arrangement the power unit 2 and the transmission system 3, including the hydraulic transmission 5 of relatively large diameter, are positioned well clear of the ground and the propeller shaft 8 is positioned adjacent the floor of the automobile, so that the floor within the body of the automobile may be flat or approximately flat over a major part of its whole area.

In the transmission system shown in FIG. 2, the various components are shown in a simplified form and the associated bearings and clutch operating means have been omitted for the purpose of clearness.

The transmission system 3 comprises overdrive gearing 14, a hydraulic torque converter 5, and gearing 16 providing selectively forward direct drive, or reverse drive. The overdrive gearing 14 comprises the input shaft 10, which is formed with a planet carrier 18 with planet gears 19 meshing with a sun gear 20 and an annulus gear 21. The sun gear 20 is formed on one end of a sleeve 22, the other end of which is formed with a gear wheel 23, and the annulus gear 21 is formed on one end of a sleeve 24, the other end of which is formed with a gear wheel 25. The rear end of the input shaft 10 (the right-hand end of shaft 10 in FIG. 2) is drivably connectable by a one-way brake 26 to a sleeve 27 secured to the casing 15 of the torque converter 5. A gear wheel 29 on the input shaft 10 is located between the gear 25 and sleeve 27.

The term one-way clutch is used herein to describe the known type of mechanical coupling which permits relative rotational movement between two elements in one direction but prevents relative rotational movement in the other direction. The one-way clutch 26 can thus transmit driving torque in one direction from the shaft 10 to the sleeve 27, and permit the sleeve 27 to over-run the shaft 10 when no torque is being transmitted from the shaft 10 to the sleeve 27.

The gear wheel 29 is surrounded by a control sleeve 30 having internal rear splines 31 continuously engaged with external splines 32 on the sleeve 27, and internal front splines 33 engageable with the teeth of gear wheel 25. The rear splines 31 are engageable with the teeth of gear wheel 29, so that the control sleeve 30 is selectively adjustable axially to a position in which it couples the gear wheel 25 directly to the sleeve 27 (as shown) or to a position in which it couples the gear wheel 29 directly to the sleeve 27.

The torque converter 5 serves to couple the sleeve 27 to an intermediate shaft 34 aligned with the input shaft 10. The impeller 28 of the torque converter 5 is secured to the casing 15, and thus drivably connected to the sleeve 27, and the runner 35 of the torque converter is mounted on the front end of the intermediate shaft 34. The reaction member 36 is mounted on a sleeve 37. Between sleeve 37 and the fixed outer casing 3' of the transmission system is a one-way brake 38. The intermediate shaft 34 forms the input shaft for the reduction gearing 16 and also drives an oil pump 39 positioned axially between the torque converter 5 and the reduction gearing 16.

The reduction gearing 16 comprises a planet carrier 40 having planet gears 41 (one only of which is shown in FIG. 2) meshing with a sun gear 42 mounted on shaft 34 and with an annulus gear 43 mounted on the pinion shaft 44 of the usual differential unit, the said unit comprising a bevel pinion 44' and a crown wheel 44''. The planet carrier 40 is provided with a brake drum 45 with which is associated a controllable brake band 46, and the annulus gear 43 is coupled to a drum 47 surrounding the planet carrier 40. Coned clutch elements 48 and 49 mounted between the drum 47 and carrier 40 serve to couple the planet carrier 40 to the annulus gear 43 when required. The clutch elements 48 and 49 are spaced apart to form an annular chamber 50 which communicates through a radial duct 50' with the pressure outlet of the oil pump 39.

A ring 51 mounted on the drum 47 is movable axially to a position in which it seals a bleed port 52 communicating with the annular chamber 50. When the bleed port 52 is sealed the fluid pressure in the annular chamber 50 forces the clutch elements 48 and 49 apart and thereby wedges the planet carrier 40 to the drum 47. Seals 53 prevent escape of fluid between the clutch elements 48 and 49 and the drum 47, and escape of fluid between the elements 48 and 49 and the planet carrier 40 is prevented by the engagement of the conical surfaces of the clutch elements with conical surfaces on the planet carrier 40.

The transmission system shown in FIG. 2 is capable of providing overdrive, direct drive or reverse drive between the input shaft 10 and the pinion shaft 44. For overdrive the gear wheel 23 is locked to the casing 3' by means not shown, thereby locking the sun gear 20 to the casing, the sleeve 30 is adjusted to the position shown in FIG. 2 in which the front splines 33 are engaged with the teeth of gear wheel 25, thereby directly coupling together the sleeves 24 and 27, the brake band 46 is disengaged from the brake drum 45, and the ring 51 is moved to a position in which it seals off the bleed duct 52, so that the carrier 40, drum 47, and annulus gear 43 are clutched together to rotate as a unit. Drive is then transmitted from the engine 2 (no clutch being provided) through the shaft 10, planet carrier 18, annulus gear 21 (the planet gears 19 reacting on the stationary sun gear 20 and causing the annulus gear 21 to rotate faster than the input shaft 10) and through the gear 25, sleeve 30, and sleeve 27 to the impeller 28 of the torque converter 5, and thence to the runner 35, intermediate shaft 34 and pinion shaft 44. Initially the reaction of the reaction element 36 of the torque converter is resisted by the one-way brake 38, but at the take-up point the reaction element 36 begins to rotate in the same direction as the impeller 28 and runner 35, the torque converter 5 then operating as a hydraulic turbo coupling.

For direct drive the gear wheel 23 is unlocked from the casing, thereby freeing the sun gear 20, and the drive is transmitted from the input shaft 10 directly to the sleeve 27 through the one-way brake 26. With the control sleeve 30 in the position shown in FIG. 2 the sleeve 27 is free to over-run the input shaft 10 due to the free-wheel action of the clutch 26, but if the control sleeve 30 is moved to the left until its splines 31 are clear of the teeth 25, and sleeve 27 if locked to shaft 10 by the simultaneous engagement of the splines 31 with the splines 32 and 29, there is established a direct drive condition in which engine braking is available. The left-hand position of control sleeve 30 also facilitates push starting.

It will be observed that the impeller 28 of the torque converter 5 can be driven either at engine speed or at a higher speed (overdrive). This is particularly advantageous when the torque converter is operating as a turbo coupling, since the use of overdrive enables the power loss due to slip in the turbo coupling to be reduced over the cruising speed range.

For reverse drive, the ring 51 is moved to the position shown, in which it frees the bleed port 52, thereby permitting disengagement of the cone clutch elements 48 and 59, and the brake band 46 is applied to the brake drum 45. The planet carrier 40 is thereby arrested, and the annulus gear 43 and pinion shaft 44 will be driven in the opposite direction to the sun gear 42.

Referring to FIG. 3, the input shaft 10 of the transmission system has fast therewith a planet carrier 54 which carries planet gears 55 that mesh with a sun gear 56 formed on a sleeve 57 freely mounted on the input shaft 10, and also mesh with an annulus gear 58 which is fast, via a casing 59, with the impeller 28 of a torque converter.

On the sleeve 57 is splined, for axial movement thereon, a clutch member 60 having a conical portion 61 which by axial adjustment of the clutch member 60 in one direction, under the action of pressure fluid supplied to the chamber 62 of fluid pressure servo pistons 63 operating against springs 64, can be caused to engage at its outer conical surface with a fixed conical surface 65 of the casing, whereby the sun gear 56 is held stationary and the annulus gear 58 turns in the same direction as the input shaft 10, but at a higher speed, thereby providing overdrive. Upon axial adjustment of the clutch member 60 in the other direction, e.g. under the action of the springs 64 when the fluid pressure in chamber 62 is relieved, the conical portion 61 of the clutch member 60 is caused to engage at its inner conical surface with a conical surface on the casing 59 of the torque converter, whereby the sun gear 56 is locked to the annulus gear 58 and direct drive is established between the input shaft 10 and the impeller 28 of the torque converter. The impeller 28 drives an oil pump 67, and the reaction member 36 of the torque converter is connected to the casing 66 of the transmission system through a one-way brake 38.

The runner 35 of the torque converter is mounted on the left hand end of an intermediate shaft 34, which is in line with and to the right of the input shaft 10. This intermediate shaft 34 has formed on its right-hand end a sun gear 69 with which mesh planet gears 70 carried by a planet carrier 71, the planet gears 70 also meshing with an annulus gear 72 drivably connected to the pinion shaft 44 of the differential. The planet carrier 71 is formed with a brake drum 73 and a brake band 74 is operable so that the planet carrier 71 can be arrested, so that the annulus gear 72 is then caused to rotate in the opposite direction to the intermediate shaft 34, thereby providing reverse drive.

A clutch member 75, formed with a sun gear 76 that meshes with additional intermeshing planet gears 77 carried by the planet carrier 71, has a brake drum 78 and a brake band 79 upon application of which, with the brake band 74 released, the annulus gear 72 rotates in the same direction as the intermediate shaft 34 but at a lower speed.

A second clutch member 80 is splined to the intermediate shaft 34 for axial movement thereon, so as to enable an external conical surface 80' thereon to be engaged with or disengaged from an internal conical surface 78' on the clutch member 78. When the clutch member 80 is moved to the right in FIG. 3 into engagement with the clutch member 78, the planet gears 77 are locked to the intermediate shaft 34 and direct drive is established between the intermediate shaft 34 and the pinion shaft 44. The clutch member 80 is movable to its right-hand engaged position against the action of a return spring 81 under the action of a fluid pressure actuated servo motor.

The said servo motor comprises a ring 82 located between the intermediate shaft 34 and a cylindrical inner surface of the casing 66, and having in its outer surface a port 83 and an annular groove 84 which communicates via a port 85 in the casing 66 with a controllable source of fluid pressure. Within the ring is disposed an axially movable annular piston 86 which has an annular groove 87 in communication with the port 83. The return spring 81 is arranged as shown between the clutch member 80 and a shoulder 88 on the intermediate shaft 34.

Referring to FIG. 4, the input shaft 10, which drives an oil pump 67, carries a planet carrier 90 with planet gears 91 that mesh with a sun gear 92 on a cone clutch member 93 and with an annulus gear 94 drivably connected to the casing 59 and impeller 28 of the torque converter. Between the clutch member 93 and a stationary part 95 is provided a one-way brake 95' which prevents the clutch member 93 and the sun gear 92 formed thereon from rotating backwards. An overdrive cone brake member 96 is movable axially into and out of engagement with the clutch member 93, and a direct drive cone clutch member 97 is movable axially within a chamber 97' into and out of engagement with the clutch member 93. The clutch member 97 is engageable by fluid fed under pressure through duct 100 to the chamber 97'. The clutch member 96 is engageable by means of another fluid pressure operated servo motor (not shown).

The runner 35 of the torque converter is drivably connected to an intermediate shaft 34, and the reaction member 36 is connected via a one-way brake 38 to the casing 66.

The change speed gearing shown at the right-hand side of FIG. 4 is similar to that of FIG. 3, and the same reference numerals have been used in these two figures for corresponding parts of the said gearing. However, in FIG. 4, the clutch member 80 is arranged to be engaged with clutch member 78 by the action of a spring 98 bearing against a flange 98' secured to the shaft 34, and to be disengaged, against the action of the spring 98, by a fluid pressure servo motor comprising an annular piston 99 axially slidable within a cylinder 99' projecting forwardly from the flange 98'. The piston 99 is adapted to bear against the inturned ends of a sleeve 99" connected to the clutch member 80 under the action of fluid under pressure supplied via duct 100' to the chamber between the piston 99 and flange 98'.

With neither of the members 96 and 97 engaged with the clutch member 93, power is transmitted from the engine to the impeller 28 in the overdrive ratio. In this condition of the members 96 and 97 engine braking cannot be obtained, and to enable engine braking to be obtained the overdrive brake member 96 must be engaged with clutch member 93. For direct drive between the engine and the impeller 28 the direct clutch member 97 must be engaged with the clutch member 93 (the brake member 96 being disengaged) the one-way brake 95', which serves as a reaction member during overdrive, overrunning during direct drive. Change-over between these two conditions will occur without interrupting the drive and will be smooth, always occurring at the instant when the torque on sun gear 92 reverses. To avoid any possibility of shock the over-drive clutch 93, 96 is capable of transmitting the engine braking torque but will slip when subjected to full engine power.

The operation of the change speed and reverse gear at the right-hand side of the torque converter is as described in connection with FIG. 3.

The transmission system shown in FIG. 5 is similar to that shown in FIG. 4, except that in FIG. 5 friction plate clutches are employed in place of the cone clutches shown in FIG. 4. Similar reference numerals have been used in FIGS. 4 and 5 for similar parts.

The sun gear 92 can be arrested by means of a friction clutch comprising a friction plate 101 engageable against the casing 66 by a presser plate 102, and alternatively the annulus gear 94 can be locked to the planet carrier 90 by means of a friction clutch comprising a friction plate 103 carried by the planet carrier 90, and engageable by a presser plate 103' against a friction surface 103" on the casing 59 of the torque converter. The presser plate 103' forms a piston axially slidable within a cylinder 59' in the casing 59 under the action of pressure fluid supplied through duct 100, to the chamber between the presser plate 103' and a rear wall 59" of the cylinder 59'. The planet carrier 71 is provided with a set of spaced apart clutch plates 104 and the sleeve 76' carrying the sun gear 76 is provided with a set of spaced apart clutch plates 105, the two sets of clutch plates being interleaved and engageable with one another by a presser plate 106 under the action of a spring 106'. The plates 104, 105 can be disengaged by feeding fluid under pressure through duct 100' to a servo motor having a piston 106" which compresses the spring 106' against a shoulder on the sleeve 76'.

The transmission systems above described may be mounted in an automobile with the axis of the system inclined upwardly and rearwardly as shown in FIG. 1, the output shaft 44 being the differential pinion shaft or being coupled to a horizontal final drive shaft leading to the differential. This arrangement enables the torque converter to be well clear of the ground, and also minimises the tunnel in the body of the automobile, so that the floor within the body may be flat or approximately flat over a major part of its whole area.

The transmission system is also made more efficient by arranging for the overdrive gearing to be in front of the converter. Also the use of a one-way clutch, either as a reaction member as in FIGS. 4 and 5 or as to drive direct as in FIG. 2, permits smooth change-over from one ratio to another without interruption of the drive, the additional clutches shown in FIGS. 4 and 5 permitting engine braking. In FIG. 2 the control sleeve 30 enables engine braking to be obtained.

In FIGS. 3, 4 and 5 there is provided, in addition to the front oil pump 67 driven by the input shaft 10 a rear oil pump 107. The front pump 67 provides low pressure oil and the rear pump 107 provides high pressure oil for the hydraulic control system shown in FIG. 9.

Referring now to the transmission shown in FIGS. 6, 7 and 8, an input shaft 10 is provided for an epicyclic gear 210. The shaft 10 has fast therewith a planet carrier 201 which carries planet gears 202. A sun gear 203 is formed on a sleeve 204 freely mounted on the input shaft 10. An annulus gear 205 is secured to a casing 206 of a torque converter 207 which carries the impeller 208 of the converter. The planet gears 202 are in mesh with the sun gear 203 and the annulus gear 205.

The sleeve 204 is formed with a clutch member 209 carrying clutch plates 211. Corresponding clutch plates 212 are carried by an extension 213 of the casing 206 of the torque converter 207. The clutch plates 211 and 212 are arranged to be engaged with one another by means of a spring 214 which is mounted on the sleeve 204 and which urges a clutch operating member 215 to the right in FIG. 6. The member 215 can be moved to the left in FIG. 6 disengage the clutch 211, 212 by admitting fluid under pressure into a chamber 216 through passages 217 in the shaft 10.

When the clutch 211, 212 is engaged, the sun gear 203 is locked to the annulus gear 205. The epicyclic gear 210 is therefore locked and direct drive is established between the input shaft 10 and the impeller 208.

In order to provide overdrive, a one-way brake 218 is arranged between the sleeve 204 and a reaction member 219. If fluid under pressure is admitted to the chamber 216, thus disengaging the clutch 211, 212, then when the shaft 10 is driven, the planet gears 202 will react on the sun gear 203 and the annulus gear 205 and the impeller 208 will be driven in overdrive ratio.

Change over between overdrive and direct drive will always be smooth and will occur without interrupting the drive because of the provision of the one-way brake 218 to give overdrive.

The runner 222 of the torque converter 207 is splined to an intermediate shaft 223 and the reaction member 224 of the torque converter is connected to the casing 225 by means of a one-way brake 226.

The intermediate shaft 223 extends to the right-hand side of the transmission shown in FIG. 6 and is journalled in a bearing 227. At the right-hand side of FIG. 6 is provided a change-speed epicyclic gear 228 arranged to drive the crown wheel 229 of a differential unit 232 which is disposed between the torque converter 207 and the gear 228.

The input member of the gear 228 is the intermediate shaft 223. The output member is a pinion 233 which meshes with the crown wheel 229. The pinion 233 is driven by a planet carrier 234 to which it is secured by bolts 235, the drive being transmitted by splines 236.

The planet carrier 234 is provided with two series of intermeshing planet gears 237 and 238. The planet gears 237 are in mesh with a sun gear 239 formed on the intermediate shaft 223. The planet gears 238 are in mesh with a sun gear 242 formed on a sleeve 243 freely rotatable on the intermediate shaft 223, and with an annulus gear 244 formed on a member 245 freely rotatable on the planet carrier 234.

A clutch member 246 is splined on the right hand end of the intermediate shaft 223 and carriers clutch plates 247. Corresponding clutch plates 248 are carried on an extension of the sleeve 243, and the plates 247 and 248 are arranged to be engaged by a clutch operating member 249. Springs 251 are provided which urge the clutch operating member 249 away from the clutch member 246 to disengage the clutch and fluid under pressure is admitted to a chamber 252 in order to move the member 249 towards the member 246 and engage the clutch.

The pinion 233 is mounted in tapered roller bearings 253 and 254 which are inclined in opposite directions to the axis of rotation of the pinion.

The sleeve 243 and the member 245 are provided with fluid-operated brakes 255 and 256 respectively.

The operation of the gear 228 is as follows. Direct drive through the gear is obtained by releasing brakes 255 and 256 and admitting fluid under pressure to the chamber 252 thus forcing the clutch operating member 249 to the left in FIG. 6 and engaging the clutch 247, 248. With the clutch 247, 248 engaged, the gear 228 is locked and the planet carrier 234 and the pinion 233 turn in the same direction as the intermediate shaft 223 and at the same speed.

Reverse drive through the gear 228 is obtained by freeing the clutch 247, 248 and operating the brake 256 which prevents the member 245 from turning. Drive is then transmitted from the intermediate shaft 223 to the planet gears 237 and then to the intermeshing planet gears 238. These gears react on the stationary annulus gear 244 formed on the member 245 and urge to the planet carrier 234 in the opposite direction to the direction in which the intermediate shaft 223 is rotating.

To engage low gear, the brake 255 is operated, the clutch 247, 248 being free. Operation of the brake 255 locks the sleeve 243 on which is formed the sun gear 242 which meshes with the planet gears 238. In this case, the reaction on the planet carrier 234 urges it in the same direction as the intermediate shaft 223 but at a lower speed.

When the gears 210 and 228 are set for direct drive they are locked and thus engine braking is available in direct drive. This is an advantage over arrangements in which engine braking is only available in overdrive, where it is less effective, unless special locking arrangements are provided.

The mounting of the pinion in the differential and the general arrangement in the present transmission are such that despite the fact that the differential is located between the epicyclic gears 210 and 228, only one transmission shaft crosses the differential case.

The transmission has two pumps 257 and 258 which provide fluid under pressure to operate the clutches 211, 212 and 247, 248 and the brakes 255 and 256. The front pump 257 is driven by an extension 259 of the impeller 208 of the torque converter 207. The rear pump 258 (FIG. 7) is driven by a transverse shaft 261 carrying a gear 262 in mesh with a gear 263 formed on the planet carrier 234. This arrangement ensures that the rear pump 258 is driven at high speed and thus ensures that sufficient fluid pressure is available to operate the transmission for push-starting the car even when the car is only being pushed at walking speed.

The transverse shaft 261 carries a governor 264 connected to a sliding piston 265 which controls the supply of fluid to the chambers 216 and 252 and to the operating members for the brakes 255 and 256.

A selector valve (not shown) is provided which gives the driver overall control over the transmission.

FIG. 8 shows the differential unit of the present transmission. The axle shafts 266 and 267 are located each in one conical bearing 268 and 269 respectively and the shafts are located by these bearings by thrust washers 302, 305, a distance piece 301 and snap rings 303, 304. The planet pinions of the differential are located by thrust washers 307.

FIG. 9 shows a control system which will be described in conjunction with the transmission of FIG. 5. Similar control systems may be used in conjunction with the other transmissions described and illustrated, necessary adaptations being made in each case. Referring to FIG. 9, the pumps 67 and 107 are both arranged to feed oil to a dump and check valve device 136. The device 136 comprises an inlet chamber 137 connected by a pipe 138 to the outlet of the pump 67, a further inlet chamber 139 connected by a pipe 140 to the outlet of the pump 107, and an outlet chamber 141 connected by pipes 109, 135 to a selector valve 108 and a turbo-coupling respectively. The chambers 137, 139 are arranged in parallel spaced relationship and are provided at their inner ends with ball controlled ports 142 opening into the outlet chamber 141. The walls of the chambers 137, 139 are provided with opposing axially aligned ports 143, 144 communicating with a low pressure oil reservoir (not shown), and a control member 145 extends through the ports 143, 144 and transversely across the chambers 137, 139, the end of the control member 145 adjacent the chamber 139 being mounted in a recess 146 containing a compression spring 147 and the other end of the member 145 forming a valve sealing a port 148 opening into the outlet chamber 141. The control member 145 is provided intermediate its ends with a valve 149 which seals the port 144 and the member 145 is capable of a limited degree of axial movement to permit the valve 149 to open and close the port 143.

In operation the device 136 automatically relieves the load on the front pump 67 whenever the rear pump provides sufficient pressure to operate the control system. With the engine at rest, the spring 147 biases the control member 145 into a position in which the port 143 is sealed by the valve 149. With the vehicle stationary and the engine turning at low speed only the front pump 67 is operative, and it supplies oil to the inlet chamber 137 and thence through the ball controlled port 142 to the outlet chamber 141. When the vehicle moves the rear pump 107 comes into operation and supplies high pressure oil to the inlet chamber 139 and thence to the outlet chamber 141. The pressure in the chamber 141 acts on the end of the member 145 sealing the port 148, and when the pressure in chamber 141 reaches a predetermined value the control member 145 is moved axially to the position shown in FIG. 6 in which the output of the pump 67 is "dumped" through port 143 into a low pressure reservoir. The pump 107 then supplied all the oil required to operate the control system, and the pump 67 which delivers against no head will consume very little power.

The control system comprises a selector valve 108 which is shown in the "drive position." With the vehicle stationary and the engine turning at low speed, only the front pump 67 is operative, and it supplies oil which engages the direct drive clutch 103 associated with the epicyclic gear train in front of the torque converter, via the dump and check valve device 136, pipe 109, and governor valve 110, the piston assembly of which is at this stage to the left of the position shown, so that pipe 109 is connected to pipe 111 leading to the direct drive clutch.

When the driver presses on the throttle pedal 112 the engine speed increases, and the torque converter 5 will take up the drive. At a speed which is dependent on the position of the pedal 112, the centrifugal governor 113 which is controlled by engine speed will move the piston assembly to the position shown, in which the piston 114 blanks off the pipe 111 thereby disengaging the direct drive clutch 103 and connecting pipe 109 to a pipe 115 leading to the servo-motor of the overdrive brake 101. As soon as the direct drive clutch 103 disengages, the one-way clutch 95 takes up the drive.

Should the load on the engine increase so that its speed falls, the governor 113 will move to the left so as to again connect pipes 109 and 111, engaging the direct drive clutch, and to blank off the pipe 115, disengaging the overdrive brake 101.

Direct drive can, however, be re-engaged when the vehicle is travelling at speed by depressing the throttle pedal 112 to the limit of its travel, the pedal 112 overriding the control exercised by the governor 113 and moving the piston 114 to the left to connect pipes 109 and 111. A spring-loaded lever 150 engaging in a detent 151 in the throttle linkage 152 provides an increased resistance to downward movement of the pedal 112 at the position in which the pedal overrides the governor control, to indicate to the driver the limit of travel of the pedal 112 when the piston 114 is under the control of the governor 113.

Oil delivered by the pumps 67 and 107 is also fed via pipe 116 to the selector valve 108, and in the "drive" position of this valve as shown the pipe 116 is connected to a pipe 117 which normally communicates via the governor valve 110 with a pipe 118 leading to the servo-motor that controls the direct drive clutch 104, 105, so that this clutch is engaged. The pipe 116 also communicates with a pipe 119 leading to a low speed relay valve 120 that controls the servo motor of the low speed brake band 79, the piston 121 normally blanking off the pipe 119 so that the brake band 79 is released. The piston is held in the position shown by the pressure of fluid fed in the pipe 118 which communicates with the underside of the piston 121 via a port 122.

The piston 123 of a reverse interlock valve 124 is subject to the pressure of oil delivered by the rear pump 107, and when the vehicle is moving forward this pressure keeps the piston 123 in the position shown against the action of a spring 125. In this position the piston 123 blanks off a pipe 126 leading from the selector valve 108, and also isolates a pipe 132 leading to the control servo motor of the reverse brake band 74, so that the latter is released.

If, with the vehicle stationary, the driver moves the selector valve 108 to the right from the position shown, pipe 117 is blanked off by a piston 128, so that there is no pressure in pipe 118 and the piston 121 can descend under the action of the springs 129. Oil can then flow from the pipe 116 to the pipe 119, through the valve 120 and pipe 130 to the servo motor of the low speed brake band 79, so that the vehicle moves forward at low speed when the pedal 112 is depressed.

If, with the vehicle stationary, the driver moves the selector valve 108 further to the right from the position shown than for the low speed forward drive, pipe 116 is put in communication with the pipe 126 and is isolated from pipes 117 and 119. Since the vehicle is stationary no pressure is applied by the rear pump 107 via pipe 131 to the piston 123, which therefore takes up a position to the left of that shown and puts pipe 126 in communication with a pipe 132 leading to the servo motor of the reverse brake band 74, which is thereby applied so that when the pedal 112 is depressed the vehicle starts in reverse.

The selctor valve 108 also has a neutral position, to the left of that shown, in which the piston blanks off pipe 116. The required position of selector valve 108 may be selected for example, by means of a control lever or a push-button mechanism.

The setting of the selector valve 108 may be preselected at any speed. The valve 124 serves as a safety device in that when the vehicle is moving forward at any speed pressure of oil from the rear pump 107 keeps the valve 124 in the position shown in which it prevents oil from reaching the servo motor of the reverse band brake 74, which can only be applied when the rear pump 107 does not generate any pressure, or when the vehicle is stationary or in reverse. The valve 120 also acts as a safety device in that when in the position shown it prevents low speed from engaging even if selected so long as the car is moving in overdrive. For engagement of low speed the piston assembly of the governor valve must be to the left of the position shown, that is the engine speed must fall below a predetermined value.

So long as the rear pump 107 delivers sufficient oil to ensure proper lubrication of the parts of the transmission, to operate the speed and reverse control devices and to supply sufficient oil to the turbo converter through pipe 135 to compensate for leakage therefrom, the oil delivered by the front pump 67 is dumped. If for any reason the pressure delivered by rear pump 107 falls below a predetermined value, the spring 147 of the device 136 forces the valve 149 into the port 144 to permit the front pump 67 to supply oil to the outlet chamber 141.

The rear pump 107 also supplies the required pressure for a push start, and for the reverse interlock valve 124.

I claim:

1. A power transmission system for an automobile vehicle comprising in combination a first epicyclic change-speed gearing, a hydraulic transmission, a second epicyclic change-speed gearing and a differential unit, said differential unit being physically located between said hydraulic transmission and said second epicyclic change-speed gearing, said first epicyclic change-speed gearing comprising a sun gear element, a ring gear element drivably connected to the primary member of the hydraulic transmission, a planet gear carrier element drivably connected to the engine and having planet gears meshing with said sun gear element and said ring gear element, clutch means movable to clutch together two of said elements to provide direct drive through said epicyclic change-speed gearing, a reaction member and a one-way brake disposed between said reaction member and said sun gear element to provide overdrive through said epicyclic change-speed gearing upon movement of said clutch member to declutch said two elements, an intermediate shaft being provided to which the output element of said hydraulic transmission is drivably connected, said intermediate shaft being the only transmission shaft traversing said differential unit, said shaft constituting the input element of the second epicyclic change speed gearing, said second epicyclic change-speed gearing comprising a first sun gear element formed on said intermediate shaft, a sleeve freely rotatably mounted on said shaft, a second sun gear element formed on said sleeve, a ring gear element operatively associated with said second sun gear element, a planet gear carrier drivably connected with the pinion of said differential unit, said planet gear carrier having two intermeshing series of planet gears comprising a first series of planet gears in mesh with said first sun gear element, a second series of planet gears in mesh with said second sun gear element and with said ring gear element, clutch means oprable to clutch said sleeve to the intermediate shaft to lock the second epicyclyic gearing for direct drive, a first brake operatively associated with said ring gear element to provide reverse drive when operated with said clutch means rleased, and a second brake operatively associated with said sleeve to provide low drive when operated with said clutch means released.

2. A power transmission system for an automobile vehicle according to claim 1, wherein the clutches and brakes provided in said first and second epicyclic change-speed gearings are operable by fluid under pressure and two pumps are provided to supply fluid under pressure, said pumps comprising a front pump driven from the hydraulic transmission and a rear pump driven at substantially higher speed than the front pump from the output element of the second change-speed epicyclic gearing so that it can provide fluid under sufficient pressure to operate the transmission when the car is being pushed at walking pace.

References Cited in the file of this patent
UNITED STATES PATENTS

| | | |
|---|---|---|
| 2,738,023 | Barenyi | Mar. 13, 1956 |
| 2,932,220 | Nash | Apr. 12, 1960 |
| 2,949,041 | Wildhaber | Aug. 16, 1960 |
| 3,009,368 | De Lorean | Nov. 21, 1961 |